(12) United States Patent
Guo

(10) Patent No.: US 11,043,711 B2
(45) Date of Patent: Jun. 22, 2021

(54) BATTERY WRAPPING FILM, BATTERY COMPONENT, TERMINAL

(71) Applicant: Huawei Technologies Co., Ltd., Shenzhen (CN)

(72) Inventor: Renwei Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 64 days.

(21) Appl. No.: 16/328,130

(22) PCT Filed: Mar. 29, 2017

(86) PCT No.: PCT/CN2017/078534
§ 371 (c)(1),
(2) Date: Feb. 25, 2019

(87) PCT Pub. No.: WO2018/126541
PCT Pub. Date: Jul. 12, 2018

(65) Prior Publication Data
US 2019/0189977 A1   Jun. 20, 2019

(30) Foreign Application Priority Data

Jan. 5, 2017   (CN) .......................... 201710007886.6

(51) Int. Cl.
*H01M 50/116* (2021.01)
*H01M 50/10* (2021.01)
*H01M 50/543* (2021.01)

(52) U.S. Cl.
CPC ......... *H01M 50/116* (2021.01); *H01M 50/10* (2021.01); *H01M 50/543* (2021.01)

(58) Field of Classification Search
CPC ........ H01M 2/0267; H01M 2/02; H01M 2/30; H01M 50/116; H01M 50/543; H01M 50/10
See application file for complete search history.

(56) References Cited

U.S. PATENT DOCUMENTS

| 5,725,966 A | 3/1998 | Abe et al. |
| 2006/0057286 A1 | 3/2006 | Gibbons et al. |

(Continued)

FOREIGN PATENT DOCUMENTS

| CN | 1949558 A | 4/2007 |
| CN | 103779516 A | 5/2014 |

(Continued)

OTHER PUBLICATIONS

Heiji Katsu, "JP-2015103370-A English Translation", Published Jun. 2015.*

(Continued)

*Primary Examiner* — Jimmy Vo
(74) *Attorney, Agent, or Firm* — Conley Rose, P.C.

(57) ABSTRACT

A battery wrapping film, a battery component, and a terminal, where a first glue dot area and a second glue dot area are disposed in a first plane of the battery wrapping film to connect the battery and the battery wrapping film. The first glue dot area corresponds to a protruding area in a first plane of a housing, and the second glue dot area corresponds to a recessed area in the first plane of the housing. Hence, sparse glue dots are dispensed on the wrapping film corresponding to the protruding area on the housing, and dense glue dots are dispensed on the wrapping film corresponding to the recessed area on the housing, ensuring that the battery of the battery component is uniformly forced and is easy to detach.

20 Claims, 4 Drawing Sheets

(56) References Cited

U.S. PATENT DOCUMENTS

| | | | | |
|---|---|---|---|---|
| 2006/0093905 A1* | 5/2006 | Kim | ............... | H01M 2/021 429/175 |
| 2008/0254348 A1 | 10/2008 | Hatta et al. | | |
| 2012/0244421 A1 | 9/2012 | Yamazaki et al. | | |
| 2013/0157086 A1 | 6/2013 | Kawabe et al. | | |
| 2014/0113505 A1 | 4/2014 | Lin et al. | | |
| 2015/0214517 A1 | 7/2015 | Schneider et al. | | |

FOREIGN PATENT DOCUMENTS

| | | | |
|---|---|---|---|
| CN | 203839437 U | 9/2014 | |
| CN | 203932125 U | 11/2014 | |
| CN | 204144327 U | 2/2015 | |
| CN | 204680699 U | 9/2015 | |
| CN | 105070939 A | 11/2015 | |
| CN | 205050883 U | 2/2016 | |
| CN | 205384821 U | 7/2016 | |
| CN | 205646007 U | 10/2016 | |
| CN | 205846076 U | 12/2016 | |
| CN | 205846077 U | 12/2016 | |
| CN | 106299186 A | 1/2017 | |
| JP | 2007173050 A | 7/2007 | |
| JP | 2015103370 A | * | 6/2015 |
| KR | 20010006042 A | 1/2001 | |
| WO | 2012084181 A1 | 6/2012 | |

OTHER PUBLICATIONS

Machine Translation and Abstract of Chinese Publication No. CN204680699, Sep. 30, 2015, 10 pages.

Foreign Communication From a Counterpart Application, Chinese Application No. 201780009571.3, Chinese Office Action dated Oct. 22, 2019, 5 pages.

Machine Translation and Abstract of Japanese Publication No. JP2007173050, Jul. 5, 2007, 18 pages.

Foreign Communication From a Counterpart Application, Japanese Application No. 2019-512030, Japanese Office Action dated Oct. 1, 2019, 3 pages.

Foreign Communication From a Counterpart Application, Japanese Application No. 2019-512030, English Translation of Japanese Office Action dated Oct. 1, 2019, 2 pages.

Machine Translation and Abstract of Chinese Publication No. CN1949558, Apr. 18, 2007, 3 pages.

Machine Translation and Abstract of Chinese Publication No. CN203839437, Sep. 17, 2014, 6 pages.

Machine Translation and Abstract of Chinese Publication No. CN203932125, Nov. 5, 2014, 17 pages.

Machine Translation and Abstract of Chinese Publication No. CN205050883, Feb. 24, 2016, 7 pages.

Foreign Communication From a Counterpart Application, PCT Application No. PCT/CN2017/078534, English Translation of International Search Report dated Oct. 11, 2017, 2 pages.

Machine Translation and Abstract of Chinese Publication No. CN105070939, Nov. 18, 2015, 13 pages.

Foreign Communication From a Counterpart Application, European Application No. 17889911.8, Extended European Search Report dated Jun. 13, 2019, 8 pages.

Foreign Communication From a Counterpart Application, Korean Application No. 10-2018-7033081, Korean Office Action dated Dec. 18, 2019, 4 pages.

Foreign Communication From a Counterpart Application, Korean Application No. 10-2018-7033081, English Translation of Korean Office Action dated Dec. 18, 2019, 4 pages.

* cited by examiner

BATTERY WRAPPING FILM, BATTERY COMPONENT, TERMINAL

CROSS-REFERENCE TO RELATED APPLICATIONS

This application is a U.S. National Stage of International Patent Application No. PCT/CN2017/078534 filed on Mar. 29, 2017, which claims priority to Chinese Patent Application No. 201710007886.6 filed on Jan. 5, 2017. Both of the aforementioned applications are hereby incorporated by reference in their entireties.

TECHNICAL FIELD

Embodiments of this application relate to the field of terminals, and in particular, to a battery wrapping film, a battery component, and a terminal.

BACKGROUND

Currently, a battery reuse technology for a terminal is a means of reducing costs. The battery reuse technology is a technology in which a battery is wrapped by using a wrapping film, and the battery can still be used after the wrapping film is torn from the battery. In this technology, the battery can be reused after being detached. Conventionally, even dot glues (that is, dispensing dots) are designed on a wrapping film used for a battery, to bear a force of the battery, as shown in FIG. 1. Usually, the wrapping film has two surfaces: an inner surface and an outer surface. The inner surface is referred to as a first surface, and the outer surface is referred to as a second surface. Even dot glues are disposed on the first surface of the wrapping film, the first surface of the wrapping film is attached to the battery, and a roller rolls on the second surface of the wrapping film, to complete a process of wrapping the battery by using the wrapping film. After the battery is wrapped by using the wrapping film, the battery and the wrapping film are installed inside a housing of a battery component together.

However, to accommodate internal flat cables of the battery component, the housing of the battery component is arranged as a concave-convex structure, and the flat cables are accommodated at recessed positions. For the housing having the concave-convex structure, when the wrapping film having even dispensing dots comes into contact with the housing, protruding positions on the housing have a relatively high bonding strength, and the recessed positions have a relatively low bonding strength. Because the housing has an uneven surface and is not uniformly forced, in a process in which the wrapping film is torn from the battery, the battery is not uniformly forced. As a result, a surface of the battery is damaged, and the battery is deformed when the battery component rolls or falls.

SUMMARY

Embodiments of the present invention provide a battery wrapping film, a battery component, and a terminal. A sparse glue dot area on the battery wrapping film of the battery component corresponds to a protruding area on a housing of the battery component, and a dense glue dot area on the battery wrapping film corresponds to a recessed area on the housing of the battery component, ensuring that a battery in the battery component is uniformly forced and is easy to detach.

According to a first aspect, a battery wrapping film is provided. A first glue dot area and a second glue dot area are provided in a first plane of the battery wrapping film, to connect a battery and the battery wrapping film.

The first glue dot area corresponds to a protruding area in a first plane of a housing, and the second glue dot area corresponds to a recessed area in the first plane of the housing.

In an optional implementation, a dispensing amount of a glue dot in the first glue dot area is less than a dispensing amount of a glue dot in the second glue dot area.

In an optional implementation, when a dispensing amount of each glue dot in the first glue dot area is different from a dispensing amount of each glue dot in the second glue dot area, the dispensing amount of each glue dot in the first glue dot area is less than the dispensing amount of each glue dot in the second glue dot area.

In an optional implementation, when a dispensing amount of each glue dot in the first glue dot area is the same as a dispensing amount of each glue dot in the second glue dot area, a quantity of glue dots in the first glue dot area is less than a quantity of glue dots in the second glue dot area.

In an optional implementation, a dispensing amount in the first glue dot area is zero.

In an optional implementation, the glue dot in the first glue dot area uses a first material, and the glue dot in the second glue dot area uses a second material.

According to a second aspect, a battery component is provided. The battery component may include a battery, a housing, and the battery wrapping film according to the first aspect.

According to a third aspect, a terminal is provided. The terminal may include the battery component according to the second aspect.

DESCRIPTION OF EMBODIMENTS

The technical solutions of this application are further described in the following in detail with reference to accompanying drawings and embodiments.

A battery component provided in this application may be applicable to a terminal, and the terminal may be user equipment (User Equipment, UE) such as a mobile phone (or referred to as a "cellular" phone), a mobile computer, or a smartwatch.

Figure 1:
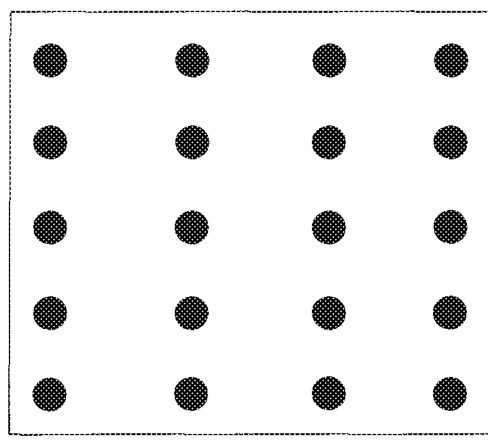
FIG. 1 is a schematic structural diagram of a wrapping film.
Figure 2:
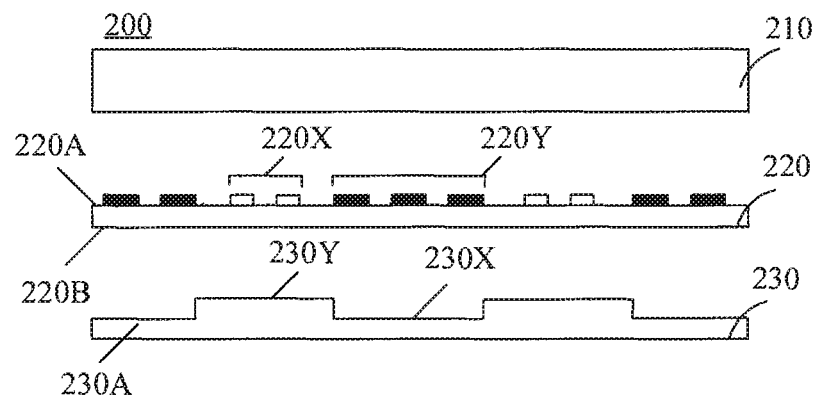
FIG. 2 is a schematic structural diagram of a cross section of a battery component according to an embodiment of the present invention.

FIG. 2 is a schematic structural diagram of a cross section of a battery component 200 according to an embodiment of the present invention. As shown in FIG. 2, the battery component 200 may include a battery 210, a battery wrapping film 220, and a housing 230.

A first glue dot area 220X and a second glue dot area 220Y are disposed on a first surface 220A of the battery wrapping film 220, dispensing dots are disposed in the first glue dot area 220X and the second glue dot area 220Y, and the dispensing dots are used to bond the battery 210 and the battery wrapping film 220. The battery wrapping film 220 may be made of, for example, a resin material.

The battery 210 wrapped with the battery wrapping film 220 is placed in a first plane 230A of the housing 230. The first glue dot area 220X corresponds to a protruding area 230Y in the first plane 230A of the housing 230, and the second glue dot area 220Y corresponds to a recessed area 230X in the first plane 230A of the housing 230. The recessed area 230X is used to accommodate a conducting wire used for power transmission. The housing 230 may be made of a metal material.

Optionally, to ensure that the battery 210 is uniformly forced, a dispensing amount of each glue dot in the first glue dot area 220X on the first surface 220A of the battery wrapping film 220 is less than a dispensing amount of each glue dot in the second glue dot area 220Y. In other words, the first glue dot area 220X may be referred to as a sparse glue dot area, and the second glue dot area 220Y may be referred to as a dense glue dot area.

It may be understood that, the glue dots in the first glue dot area 220X and the second glue dot area 220Y may use a same material or different materials.

Optionally, when a dispensing amount of each glue dot in the first glue dot area 220X is the same as a dispensing amount of each glue dot in the second glue dot area 220Y, a quantity of glue dots in the first glue dot area is less than a quantity of glue dots in the second glue dot area.

Figure 3:
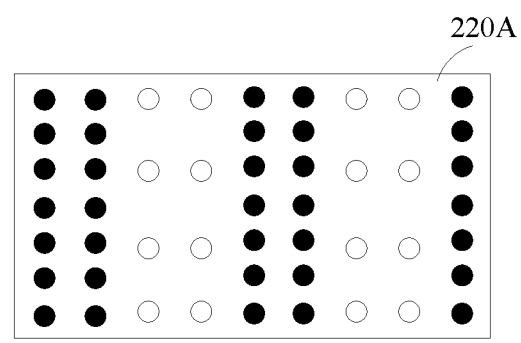
FIG. 3 is a schematic structural diagram of a wrapping film according to an embodiment of the present invention.

As shown in FIG. 3, there are solid glue dots in the second glue dot area 220Y, and there are hollow glue dots in the first glue dot area 220X. A dispensing amount of each hollow glue dot in the first glue dot area 220X is the same as that of each solid glue dot in the second glue dot area 220Y, and a quantity of rows of the hollow glue dots in the first glue dot area 220X is less than a quantity of rows of the solid glue dots in the second glue dot area 220Y. That is, a quantity of the hollow glue dots in the first glue dot area 220X is less than a quantity of the solid glue dots in the second glue dot area 220Y.

Figure 4:
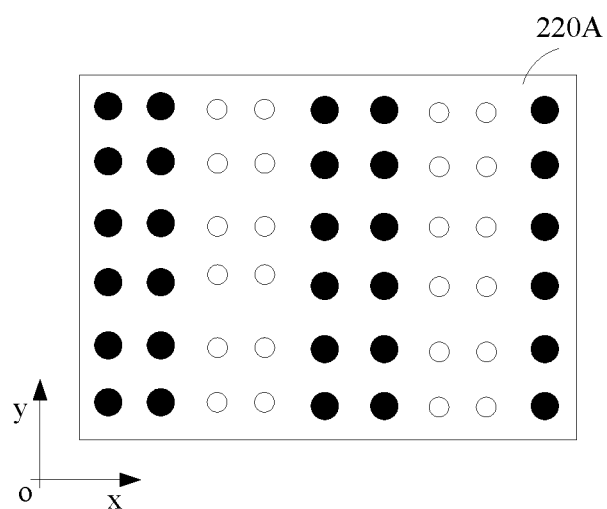
FIG. 4 is a schematic structural diagram of another wrapping film according to an embodiment of the present invention.

Optionally, when a dispensing amount of each glue dot in the first glue dot area 220X is different from a dispensing amount of each glue dot in the second glue dot area 220Y, the dispensing amount of each glue dot in the first glue dot area is less than the dispensing amount of each glue dot in the second glue dot area. As shown in FIG. 4, there are solid glue dots in the second glue dot area 220Y, and there are hollow glue dots in the first glue dot area 220X. In the first glue dot area 220X and the second glue dot area 220Y, quantities of rows of the glue dots are the same. In each row, a height of a circle center of each hollow glue dot in the first glue dot area 220X and a height of a circle center of each solid glue dot are the same on a y axis in a coordinate system, and a dispensing amount of each solid glue dot is greater than a dispensing amount of each hollow glue dot.

Figure 5:
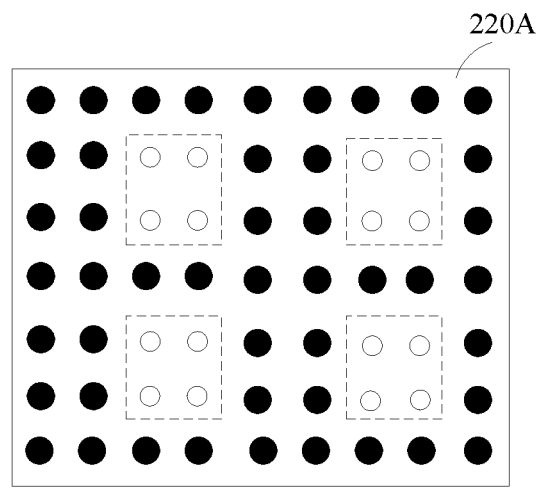
FIG. 5 is a schematic structural diagram of still another wrapping film according to an embodiment of the present invention.

It may be understood that, it may be learned from content shown in FIG. 3 to FIG. 5 that positions and quantities of the glue dots in the first glue dot area 220X and the second glue dot area 220Y on the first surface 220A may vary with shapes of the recessed area 230X and the protruding area 230Y on the housing 230. As shown in FIG. 5, four protruding areas 230Y are disposed in the first plane 230A of the housing 230, and recessed areas 230X are disposed in a remaining part of the first plane 230A. Therefore, four first glue dot areas 220X corresponding to the protruding areas 230Y are disposed on the first surface 220A of the battery wrapping film 220, second glue dot areas 220Y corresponding to the recessed areas 230X are disposed on a remaining part of the first surface 220A, and a dispensing amount of each hollow glue dot in the first glue dot areas 220X is less than a dispensing amount of each solid glue dot in the second glue dot areas 220Y. In other words, the first glue dot area may be referred to as a sparse glue dot area, and the second glue dot area may be referred to as a dense glue dot area.

Figure 6:
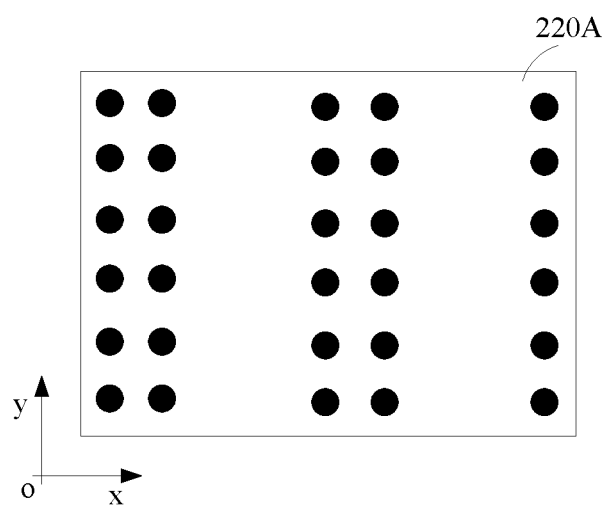
FIG. 6 is a schematic structural diagram of still another wrapping film according to an embodiment of the present invention.
Figure 7:
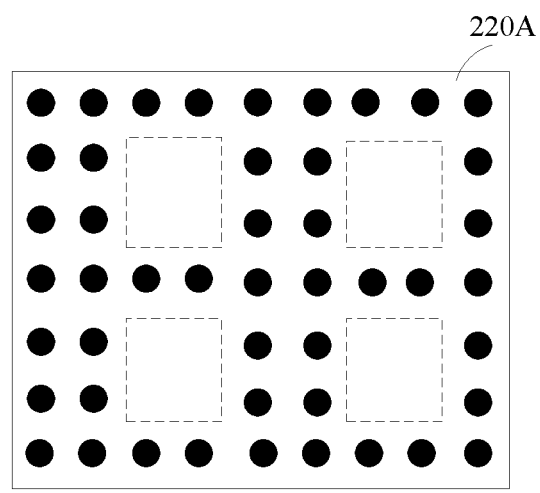
FIG. 7 is a schematic structural diagram of still another wrapping film according to an embodiment of the present invention.

Optionally, there may be zero hollow glue dots in the first glue dot area on the first surface 220A of the battery wrapping film 220, as shown in FIG. 6 and FIG. 7.

It should be noted that positions, quantities, and shapes of the glue dots in the first glue dot area and the second glue dot area on the first surface 220A of the battery wrapping film of the battery component in this embodiment are not limited to the positions, the quantities, and shapes shown in FIG. 3 to FIG. 7, and may be in other forms. This is not limited in this embodiment of the present invention.

It may be learned from the foregoing that, according to the battery component provided in this embodiment of the present invention, sparse glue dots are dispensed on the battery wrapping film that corresponds to the protruding area on the housing, and dense glue dots are dispensed on the wrapping film that corresponds to the recessed area on the housing, ensuring that the battery of the battery component is uniformly forced and is easy to detach.

An embodiment of the present invention further provides a battery component. The component includes a battery, a housing, and the battery wrapping film described in the foregoing embodiment.

In addition, an embodiment of the present invention further provides a terminal. The terminal includes the battery component described in the foregoing embodiment.

Persons skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

Persons of ordinary skill in the art may understand that all or a part of the steps in each of the foregoing method of the embodiments may be implemented by a program instructing a processor. The foregoing program may be stored in a computer readable storage medium. The storage medium may be a non-transitory (English: non-transitory) medium, such as a random-access memory, a read-only memory, a flash memory, a hard disk, a solid state drive, a magnetic tape (English: magnetic tape), a floppy disk (English: floppy disk), an optical disc (English: optical disc), or any combination thereof.

The foregoing descriptions are merely examples of specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A terminal comprising:
   a battery component comprising:
      a battery; and
      a conducting wire coupled to the battery and configured to transmit electricity from the battery, wherein the conducting wire comprises a plurality of internal flat cables;
   a housing configured to enclose the battery and comprising:
      at least two protruding areas; and
      a recessed area between the at least two protruding areas, wherein the recessed area is configured to accommodate the internal flat cables; and
   a battery wrapping film comprising:
      a first surface coupled to the battery and comprising:
         at least two first glue dot areas disposed on the first surface, wherein the at least two first glue dot areas correspond to the at least two protruding areas in a first plane of the housing; and
         a second glue dot area between the at least two first glue dot areas and corresponding to the recessed area in the first plane of the housing, wherein the second glue dot area comprises a plurality of glue dots; and
      a second surface configured to couple the battery wrapping film and the battery to the housing.

2. The terminal of claim 1, wherein a dispensing amount of a glue dot in each of the at least two first glue dot areas is less than a dispensing amount of the glue dots in the second glue dot area.

3. The terminal of claim 1, wherein a quantity of glue dots in each of the at least two first glue dot areas is less than a quantity of the glue dots in the second glue dot area.

4. The terminal of claim 1, wherein a dispensing amount in each of the at least two first glue dot areas is zero.

5. The terminal of claim 1, wherein a glue dot in the at least two first glue dot areas comprises a first material, and wherein the glue dots in the second glue dot area comprise a second material.

6. The terminal of claim 1, wherein each of the at least two first glue dot areas comprises a first number of rows of glue dots, wherein the second glue dot area comprises a second number of rows of glue dots, and wherein the first number of rows of glue dots is less than the second number of rows of glue dots.

7. The terminal of claim 1, wherein each of the at least two first glue dot areas and the second glue dot area comprises a plurality of columns of glue dots.

8. The terminal of claim 1, wherein each of the at least two first glue dot areas and the second glue dot area comprises a plurality of rows and columns of glue dots.

9. The terminal of claim 1, wherein each of the at least two first glue dot areas and the second glue dot area comprises a same number of rows and columns of glue dots.

10. The terminal of claim 1, wherein each of the at least two first glue dot areas and the second glue dot area comprises a different number of rows and columns of glue dots.

11. The terminal of claim 1, wherein the at least two first glue dot areas are comprised within the second glue dot area.

12. The terminal of claim 11, wherein the at least two first glue dot areas comprise a second plurality of dots.

13. The terminal of claim 11, wherein the at least two first glue dot areas do not comprise any glue dots.

14. The terminal of claim 1, wherein the housing is made of metal.

15. The terminal of claim 1, wherein the battery wrapping film is made of resin.

16. The terminal of claim 1, wherein the terminal is a user equipment.

17. The terminal of claim 1, wherein the terminal is a mobile phone.

18. The terminal of claim 1, wherein the terminal is a mobile computer.

19. The terminal of claim 1, wherein the terminal is a smartwatch.

20. The terminal of claim 1, wherein the glue dots bond the battery wrapping film to the battery.

* * * * *